(12) United States Patent
Bryant

(10) Patent No.: US 10,044,258 B2
(45) Date of Patent: Aug. 7, 2018

(54) ACTIVE SNUBBER

(71) Applicant: Maschinenfabrik Reinhausen GmbH, Regensburg (DE)

(72) Inventor: Angus Bryant, Regensburg (DE)

(73) Assignee: MASCHINENFABRIK REINHAUSEN GMBH, Regensburg (DE)

(*) Notice: Subject to any disclaimer, the term of this patent is extended or adjusted under 35 U.S.C. 154(b) by 0 days.

(21) Appl. No.: 15/519,084

(22) PCT Filed: Nov. 16, 2015

(86) PCT No.: PCT/EP2015/076655
§ 371 (c)(1),
(2) Date: Apr. 13, 2017

(87) PCT Pub. No.: WO2016/079039
PCT Pub. Date: May 26, 2016

(65) Prior Publication Data
US 2017/0257022 A1 Sep. 7, 2017

(30) Foreign Application Priority Data

Nov. 21, 2014 (GB) .................................. 1420706.2

(51) Int. Cl.
*H02M 3/24* (2006.01)
*H02M 1/34* (2007.01)
(Continued)

(52) U.S. Cl.
CPC ............. *H02M 1/34* (2013.01); *H02M 1/088* (2013.01); *H02M 3/04* (2013.01); *H02M 5/04* (2013.01);
(Continued)

(58) Field of Classification Search
CPC ............. H02M 1/34; H02M 2001/342; H02M 2001/344; H02M 2007/4835;
(Continued)

(56) References Cited

U.S. PATENT DOCUMENTS 5,126,931 A * 6/1992 Jitaru ................. H02M 3/33569
363/131
5,973,939 A * 10/1999 Tan .................... H02M 3/33569
363/131
(Continued)

*Primary Examiner* — Alex Torres-Rivera
(74) *Attorney, Agent, or Firm* — Andrew Wilford

(57) ABSTRACT

The present invention generally relates to a switching cell for a phase leg of a power converter and a method of controlling a power converter to drive a load, and more particularly to a plurality of such switching cells, a phase arm for a power converter, a power converter phase leg, to a power converter for driving a load, and methods of making a power converter. A switching cell for a phase leg of a power converter may comprise: a power switch for conducting a current for driving a load; a commutation path coupled in parallel with the power switch, the commutation path comprising a cell capacitor and an auxiliary switch coupled in series, the auxiliary switch configured to allow control of a conduction state of the commutation path; and a cell inductor coupled to a coupling of the power switch and the commutation path, wherein the switching cell comprises at least one control input line for receiving a control signal, the at least one control input line configured to drive a control terminal of the power switch and a control terminal of the auxiliary switch.

23 Claims, 13 Drawing Sheets

(51) Int. Cl.

| | |
|---|---|
| *H02M 7/5387* | (2007.01) |
| *H02M 1/088* | (2006.01) |
| *H02M 7/487* | (2007.01) |
| *H02M 7/04* | (2006.01) |
| *H02M 3/04* | (2006.01) |
| *H02M 5/04* | (2006.01) |
| *H02M 1/00* | (2006.01) |
| *H02M 7/483* | (2007.01) |

(52) U.S. Cl.
CPC ............. *H02M 7/04* (2013.01); *H02M 7/487* (2013.01); *H02M 7/53871* (2013.01); *H02M 2001/0048* (2013.01); *H02M 2001/344* (2013.01); *H02M 2007/4835* (2013.01)

(58) Field of Classification Search
CPC . H02M 2001/0048; H02M 2001/0051; H02M 2001/0054; H02M 2001/0058
USPC ....... 363/40, 55, 56.01, 56.02, 56.03, 56.04, 363/56.12, 57, 58, 95, 96, 97, 98, 120, 363/131, 132, 135, 136
See application file for complete search history.

(56) References Cited

U.S. PATENT DOCUMENTS

| | | | |
|---|---|---|---|
| 2004/0057261 A1* | 3/2004 | Norrga | H02M 7/4826 363/95 |
| 2010/0328975 A1 | 12/2010 | Hibino | |
| 2013/0279211 A1* | 10/2013 | Green | H02M 7/49 363/35 |
| 2014/0313797 A1* | 10/2014 | Davidson | H02M 7/49 363/65 |
| 2016/0079904 A1 | 3/2016 | Krishnamurthy | |
| 2017/0099007 A1* | 4/2017 | Oates | H02M 5/458 |

* cited by examiner

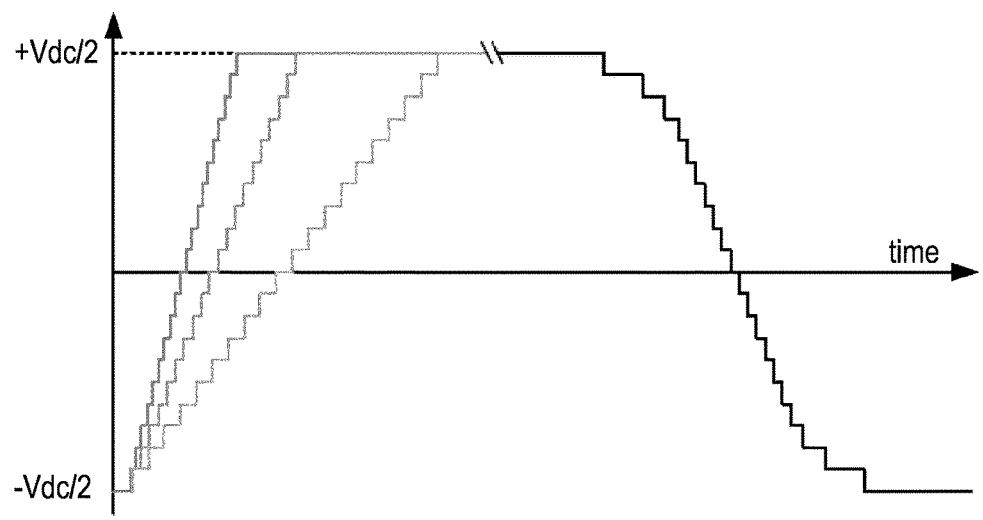
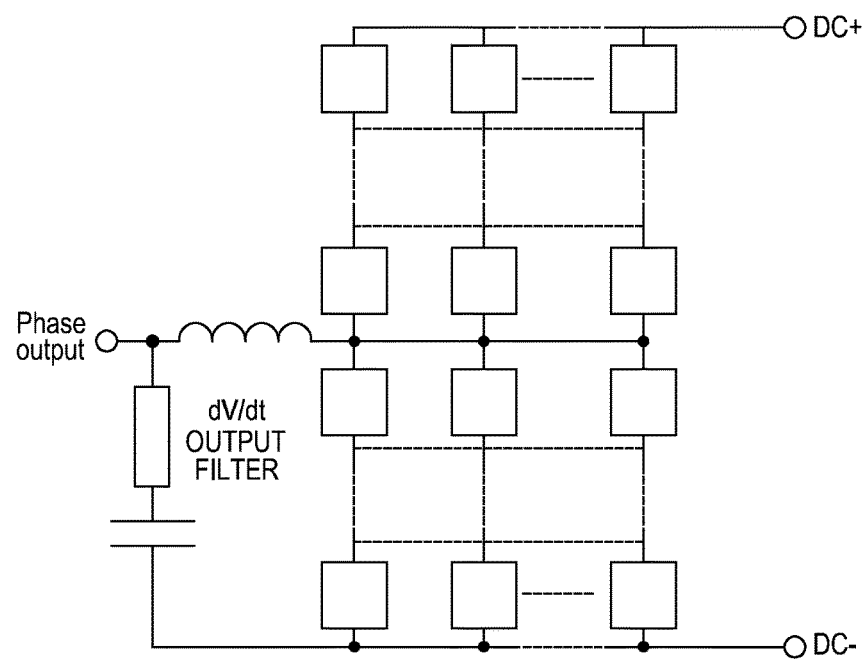
Fig.10

ACTIVE SNUBBER

CROSS REFERENCE TO RELATED APPLICATIONS

This application is the US-national stage of PCT application PCT/EP2015/076655 filed 16 Nov. 2015 and claiming the priority of British patent application 1420706.2 itself filed 21 Nov. 2014.

FIELD OF THE INVENTION

The present invention generally relates to a switching cell for a phase leg of a power converter and a method of controlling a power converter to drive a load, and more particularly to a plurality of such switching cells, a phase arm for a power converter, a power converter phase leg, to a power converter for driving a load, and methods of making a power converter.

BACKGROUND OF THE INVENTION

Wide band-gap (WBG) power semiconductor devices are approaching the point of commercial adoption in some power electronic converter applications. They have a larger band-gap than silicon, giving rise to an increased breakdown electric field strength and an increased maximum junction temperature.

The increased electric field strength results in a narrower drift region for a given breakdown voltage; advantages this may give rise to are, e.g., (i) lower on-state voltage drop (resistance for normalized area) and thus lower conduction losses; and/or (ii) faster switching and thus lower switching losses. Increased operating junction temperature is also a potential benefit, although existing device packaging cannot withstand the severe temperature cycling resulting from this under typical variable load conditions.

While the reduced conduction losses may be of most immediate benefit, greatly increased switching speed—and hence reduced switching losses and/or increased power converter switching frequencies—may generally only be taken advantage of if the commutating inductance is greatly reduced from typical levels found in IGBT-based converters. This may be in the region of 30 nH for a low-voltage converter, e.g., 690 V ac supply, using power devices with breakdown voltages of, e.g., 1200 or 1700 V. Indeed, even existing IGBTs sometimes have to be slowed down to reduce the inductive voltage overshoot levels sufficiently; directly replacing these with WBG devices (e.g., SiC MOSFETs of the same breakdown voltage rating) would generally require the same switching speed to be achieved, this may result in a significant increase of the WBG device switching losses that may make their adoption pointless.

To take advantage of WBG device potential, it may be considered to develop a switching circuit with a very small commutation inductance, preferably less than a few nH, to allow fast switching to take place without resulting in large voltage overshoots. The side effect of this however may be very fast di/dt and dv/dt switching edges, the latter also being an issue for adoption in motor drives. Furthermore, the very small commutation inductance may simply not achievable in existing converter designs above a few kW, due to the highly compact layout required.

Hence if WBG devices are to be adopted in high power converters, e.g., 100 kW and above, the ability to cope with existing commutation inductances and deliver an apparent dv/dt in line with existing IGBT switching is desirable. Furthermore, to aid market adoption the devices would preferably be available in a package similar to those used currently—e.g., EconoDual/Pack™, PrimePack™, HPM—to avoid having to completely start from scratch in converter design.

The field of power converters continues to provide a need for a switching topology that may for example allow, inter alia, greater energy efficiency, improved reliability, lower cost, compact design, suitability for standard power converter packaging, fast and/or low switching loss operation (for example in the presence of relatively large inductances to external capacitors), increased power converter switching frequencies, lower conduction losses, high maximum operating temperature, high DC supply voltage, for example relative to the power switching device breakdown voltage, reduced voltage overshoot, improved protection of inductive loads having windings (e.g., motors), etc.

SUMMARY OF THE INVENTION

According to a first aspect of the present invention, there is provided a switching cell for a phase leg of a power converter, the switching cell comprising: a power switch for conducting a current for driving a load; a series connection comprising an auxiliary switch and a cell capacitor coupled in series, the series connection coupled in parallel with the power switch; and a cell inductor coupled to a coupling of the power switch and the series connection, wherein the switching cell has a commutation loop to conduct a commutation current arising from turn-off of the power switch, the loop comprising: a first bypass circuit for blocking current flow in a direction and coupled in parallel with the power switch to conduct a said commutation current in another, opposite direction; a second bypass circuit for blocking current flow in a direction and coupled in parallel with the auxiliary switch to conduct a said commutation current in another, opposite direction; and the cell capacitor, and wherein the switching cell comprises at least one control input line for receiving a control signal, the at least one control input line configured to drive a control terminal of the power switch and a control terminal of the auxiliary switch.

Advantageously, one or more such switching cells may be provided in a power circuit in place of a power switch module (generally, a package comprising a power switch, in some cases also a commutation diode). For example, such switching cells may replace a power switch module of a power converter such as an ac-dc rectifier, dc-ac inverter, or ac-ac or dc-dc level shifter. The cell inductance may decouple the switching cell from adjacent circuitry, e.g., an adjacent switching cell, so that a commutation current relating to switching of the power switch and/or auxiliary switch may be substantially restricted to the commutation loop of the switching cell. Such a commutation loop may be small in area and/or its inductance low, this advantageously allowing fast switching of at least the power switch in an embodiment. Where a plurality of the cells are coupled together, e.g., in parallel and/or in an array of one or more rows and/or columns of cells, a total commutation current relating to switching of power switches and/or auxiliary switches of all the cells may be considered to be distributed among commutation loops of the multiple cells. Series cells, e.g., in a column of such an array, may be considered to share voltage. This may improve reliability and/or increase a maximum allowable voltage across the array.

To reduce stray inductance, coupling lines similar to strip line may be used to couple together at least the cell capacitor and power and auxiliary switches of a cell, preferably also the bypass circuits. (Similarly, such coupling line(s) may be used to form other conductors, e.g., power rails, phase output connections to load). Any such coupling line(s) may be/comprise a laminated busbar, which is generally similar to strip line but may not contain a ground plane. The busbar(s) may contain parallel thinly-separated conductors to result in a low commutation inductance between DC supply rails. A loop of strip line to couple at least the cell capacitor and power and auxiliary switches may allow wide conductors and have small separation between them. This may be advantageous for reducing commutation loop inductance.

Furthermore, switching cell(s), for example when multiplied to construct a series and/or parallel cell array, may allow advantage to be taken of devices having fast switching capability and/or low switching losses. Advantageously, the power switch of the switching cell is a wide band-gap device, e.g., comprising semiconductor material having a band-gap of at least 3 eV. Such a material may comprise, e.g., SiC or GaN. This may be enabled in an embodiment by the small commutation loop, and thus small commutation inductance, for conducting commutation current of a power switch. Additional or alternative advantages achievable by use of a WBG device include, e.g., higher temperature operation.

The cell capacitor of each cell may ensure that the cell supports an intended voltage, for example a voltage equal to that supported by other cells in a series and/or parallel connection (e.g., array) of such switching cells. Thus, good voltage and/or current sharing among the cells may be achieved. Therefore, an embodiment may allow improved distribution of power dissipation, thermal performance, reliability and/or compactness, etc. Charging of the capacitor may be determined by control of the auxiliary switch. The auxiliary switch is preferably (i.e., optionally) controlled to allow charge flow to/from the capacitor only when the power switch is OFF. The control input line (pin, track and/or wire, etc.) may receive at least one control signal to switch either or both of the power and auxiliary switches. Specifically, a said control terminal drive input line may be configured to substantially (e.g., exactly, or with a small delay) simultaneously turn one of the power switch and the auxiliary switch ON and the other of the power switch and the auxiliary switch OFF. For example, one of the power switch and auxiliary switch may comprise an n-type device and the other a p-type device, the switching cell may then be configured to control switching of the power switch and the auxiliary switch according to a shared control signal. Advantageously, a single gate drive circuit may then be used for the power switch and auxiliary switch of a switching cell.

Preferably the switching of the power and auxiliary switches is complementary. In an embodiment, the power switch is turned off (on) when the auxiliary switch of the same cell is turned on (off). This may allow the sum of the voltages across the two switches to equal the cell capacitor voltage. In an embodiment, allowing both switches to be on at the same time may risk shorting the cell capacitor. Furthermore, when the power switch switches off in an embodiment, the auxiliary switch is preferably turned on in order to clamp the power switch voltage with the cell capacitor.

Considering the substantially simultaneous turning on of one of the power switch and the auxiliary switch and the other of the power switch and the auxiliary switch off by the at least one control signal, preferably there is a small delay between turning one of the switches off and the other on. This may be considered as a 'dead-time' and may reduce the risk of shoot-through, which is where the switch turning off has not quite finished turning off by the time the other switch turns on, resulting in a short-duration short circuit through the switches. Such a shoot-through current may, at best, give extra power losses in the devices; at worst it may destroy the devices. Therefore the dead-time duration is dependent on the switching speeds of the devices. It may be required even in a fast WBG switching cell. A dead time may be, e.g., less than 5 us, 3 us, 2 us or 1 us, preferably between 350 and 750 ns. The dead time may however depend on the switching speed; the dead time may be only, e.g., 20-30 ns for, e.g., for WBG device(s); however, it may be up to, e.g., 10 us, for example for IGBT-based converter designs.

The bypass circuits generally may allow a commutation current to bypass the switches and thus allow commutation current flow around the switching cell. At least one of the first and second bypass circuits may comprise a diode. The diode may be referred to as a commutation diode, clamping diode, free-wheeling diode, etc. The diode is preferably (i.e., optionally) in anti-parallel with the corresponding switch, to conduct a commutation current in a forward direction through the diode and to block reverse current. The diode may be an intrinsic diode of the corresponding switch (power or auxiliary) or an extrinsic, generally separate component coupled across the switch. An extrinsic diode may be unnecessary for example because a power or auxiliary switch allows reverse current preferably by means of an intrinsic, e.g., body, diode of the switch.

Each switch may thus be protected by the corresponding bypass circuit in the event of a voltage spike. Such a spike may occur across an inductor (e.g., cell inductor of the switching cell, cell inductor(s) of other switching cells coupled to the switching cell, stray inductances of a circuit comprising the switching cell, and/or load inductance) for example due to a switching event of one of more power switches.

The coupling between the power switch and the series connection is preferably a direct coupling, e.g., just involving wires, tracks, terminals and/or connectors, or may comprise one or more extrinsic circuit components such as resistor, capacitor, etc.

As indicated above, two or more switching cells may be provided for example in an array of cells, e.g., one array for each phase arm of a power converter phase leg. A plurality of switching cells may comprise at least one series connection of switching cells, wherein each said switching cell of the at least one series connection is coupled to an adjacent said switching cell by a said cell inductor. A cell inductor of one switching cell may then decouple the switching cell from the adjacent cell, advantageously such that commutation loops of the switching cells are decoupled. A first and/or last switching cell of any such series connection of switching cells may be coupled, preferably via its cell inductor, directly to a power rail or output line, e.g., phase output of a power converter phase leg. (Thus a first or last switching cell may lack a cell inductor such that the commutation loop is directly coupled to the power rail or output). At least one switching cell may be coupled in parallel with a said switching cell of a said series connection of cells. Thus, a two-dimensional array of cells may be formed. Preferably such a parallel connection is achieved by providing an electrical connection between the ends of the cell inductors of the parallel cells, each other end connected to the coupling of the power switch and series connection of the corresponding cell, and providing an electrical connection between the other couplings of the power switch and series connection of the cells.

Each such series connection of switching cells may allow the plurality of cells to have a higher total voltage rating than a single switching cell. Similarly, the coupling of switching cell(s) in parallel, e.g., by means of multiple parallel series connections and/or switching cells each coupled directly across respective switching cells of a series connection, may allow the plurality of cells to have a higher total current rating than a single switching cell and/or single series connection.

At least the power devices of a plurality of switching cells (e.g., array or series and/or parallel switching cells) may take up similar active die area to a single device and/or standard phase arm having the same voltage and/or current rating (disregarding in embodiment any guard ring that may be present for voltage termination around the edge of a die). For example, for vertical power MOSFETs, the specific area (Ron,sp in ohm-cm$^2$) is generally proportional to the square of the breakdown voltage, i.e., VBR2. If say a 1200V, 10 mOhm (milli-Ohm) on resistance device is formed with area 1 cm$^2$, thus specific area 10 mOhmcm$^2$. A 600V device with of the same design type has Ron,sp equal to 10 mOhmcm$^2$× (600/1200)2, i.e., 10 mOhm achievable with 0.25 cm$^2$. If 600V devices are placed in series to make a 1200V switch this gives a 2×10 mOhm device with 1200V capability, 0.5 cm$^2$ total. Therefore two such series connections may give the 10 mOhm total, e.g., 4×0.25 cm$^2$=1 cm$^2$, using for example 4 chips. In other words, such a 1200V/10 mOhm device takes up 1 cm$^2$ regardless of whether it is formed from one 1200V device or 600V devices in series. This analogy may extend to any vertical FET device, e.g., HEMT or MOSFET. (In contrast bipolar devices such as an IGBT or diode have different I-V characteristics including an on-state voltage drop). For lateral HEMTs, e.g. lateral GaN HEMTs, generally Ron,sp is similarly proportional to the square of the breakdown voltage, i.e., VBR2. Thus, the same principle may apply as for vertical MOSFETs, i.e., multiple devices in series to achieve a desired blocking voltage may take up substantially the same area as one device for the same on-resistance. Therefore, preferably in an embodiment at least some of the switching cells (preferably all) of the plurality comprises a vertical FET device or lateral HEMT or the power switch, optionally also the auxiliary switch.

As indicated above, at least one said power switch may comprise a wide band-gap semiconductor device, which may be bipolar or field-effect-based. For example, a WBG device may be based on silicon carbide (SiC) or gallium nitride (GaN), e.g., SiC MOSFET or GaN HEMT. Additionally or alternatively, the auxiliary switch is such a WBG device. Preferably both the power and auxiliary switches of at least one, preferably all, cells are WBG devices. Additionally or alternatively, any one or more of the power and/or auxiliary switches of the cells may comprise a non-WBG device in the form of, e.g., IGBT, MOSFET, HEMT, BJT, JFET, GTO (gate turn-off thyristor) or GCT (Gate-Commutated Thyristor) etc. The low inductance commutation loop for each power switch may similarly allow improved operation such as faster switching or reduced power consumption when using non-WBG devices.

An auxiliary switch of at least one said switching cell may be physically smaller than the power switch of the switching cell; for example, it may have a smaller semiconductor area and/or smaller package by volume and/or footprint. Additionally or alternatively, the auxiliary switch may have a lower power rating than the power switch. Either may be the case for example where the auxiliary device generally only carries current when output of a circuit comprising the plurality of cells is ramping, e.g., stepping, through an edge, whereas the power switches may carry current when the phase leg output is in a steady state and/or the phase arms are in their respective fully ON and fully OFFs states (power or auxiliary switches all on in an embodiment, e.g., the phase leg output being considered in its 'high' or low' state of DC+ or DC− potential, respectively), and/or when the phase leg output is varying between intermediate (partially ON) states.

Preferably, at least one of the switching cells has a resistor in parallel with the cell inductor of the switching cell. Such a resistor may dampen oscillations that arise due to the cell, stray and/or load inductance(s) and/or capacitance such as the cell capacitance(s) and/or a DC link capacitor.

At least one drive circuit may be provided to drive at least one of a control terminal of the power switch and a control terminal of the auxiliary switch of a said switching cell. The drive circuit may be configured to draw power from the switching cell. For example, the drive circuit may draw power from a said cell capacitor of the switching cell. Additionally or alternatively, the gate drive may harvest power from the cell inductor via inductive coupling. Any such arrangement may allow a more compact and/or less complex circuit, for example not requiring conversion and/or connection of external power rails to appropriate voltages for each switching cell.

Considering a specific application, a power converter may comprise at least one phase leg, e.g., half-bridge circuit, comprising two phase arms coupled to provide a phase output for driving a (generally inductive) load. One or more such phase arms, preferably for example both arms of a half-bridge phase leg, may comprise a plurality of the switching cells. Any such phase output may further comprise a filter to reduce or filter out high dv/dt components, for example in an effort to protect windings of inductive loads such as motors.

Thus, there may be provided a power converter for driving a load, the power converter comprising at least one power converter phase leg as defined above, each said phase leg having an output line for driving a phase input of a said load. Preferably, the power converter further has a link capacitor, which may be referred to as a storage capacitor or DC link capacitor. Both the/each phase leg and the link capacitor are preferably coupled between a first power rail and a second power rail.

A power converter of an embodiment may be a multilevel converter, e.g., designed to provide three or more voltage output levels rather than merely to swing between low and high output states (as for a square wave output). Where sufficient output levels are provided for, the power converter output may provide a shaped output voltage profile such as a ramp or sine wave output.

Preferably, a power converter using a plurality of switching cells has an output voltage rating of at least 600V, e.g., up to 6.5 kV, and/or a current rating of at least 50 A, e.g., up to 3.6 kA.

A power converter may be made, e.g., upgraded, by replacing at least one power switch with a plurality of switching cells as defined above. For example, the power converter may originally comprise a phase arm having at least one power switch module such as an IGBT module. That phase arm may be substituted by a phase arm comprising switching cells as defined above. For example a sole IGBT of a phase arm may be replaced by a 1- or 2-dimensional array of switching cells. Preferably at least one switching cell of the replacement phase arm comprises wide band-gap semiconductor device(s) as the power and/or auxiliary switch(es) of the switching cell.

Similarly, a power converter to be made/upgraded may comprise a phase arm having a turn-on snubber and at least one GTO module. The snubber and/or GTO module(s) may be replaced with a phase arm having switching cells as defined above. The/each GTO module may comprise a GTO and preferably also a commutation diode in parallel with the GTO. If a commutation diode is present in parallel with a GTO, then the diode may be re-used as one of the bypass circuits of the switching cell, e.g., in anti-parallel with the power switch.

According to another aspect of the present invention, there is provided a method of controlling a power converter to drive a load, the power converter having a phase leg coupled between two power rails, the phase leg comprising two arms each having a plurality of switching cells, the arms coupled at an output of the converter, wherein each said switching cell comprises: a power switch for conducting a current for driving a load; a series connection comprising an auxiliary switch and a cell capacitor coupled in series, the series connection coupled in parallel with the power switch; and a cell inductor coupled to a coupling of the power switch and the series connection, wherein the switching cell has a commutation loop to conduct a commutation current arising from turn-off of the power switch, the loop comprising: a first bypass circuit for blocking current flow in a direction and coupled in parallel with the power switch to conduct a said commutation current in an other, opposite direction; a second bypass circuit for blocking current flow in a direction and coupled in parallel with the auxiliary switch to conduct a said commutation current in an other, opposite direction; and the cell capacitor, and the method comprising at least one step of switching a first number of switching cells of one said arm ON and a second number of the switching cells of the other arm OFF to advance a voltage profile at the output of the converter and maintain a voltage across the phase leg, a said switching of a switching cell ON comprising turning the power switch of the switching cell ON and the auxiliary switch of the switching cell OFF, wherein the first and second numbers are one or more.

Thus, a total voltage across the phase leg may remain substantially (e.g., exactly) constant, while a step increase or decrease along a voltage profile, e.g., transition to a final (e.g., fully ON and OFF states of phase arms) voltage (e.g., of a 'low' or 'high' phase leg output state as discussed above), occurs on the output line (e.g., wire, track, connector and/or pin). The voltage profile may be for example a square wave and the step(s) may allow an edge/transition between fully ON/OFF states of the arms (e.g., 'high' and 'low' states as discussed above) to progress, e.g., smoothed and/or rounded, as desired. Preferably, the first and second numbers (of switching cells of the one and other arm as mentioned above) are the same.

At least two said switching cells of either/both arms may be coupled in parallel, the method comprising switching said parallel cells at different times, e.g., using respective control signals or otherwise switches that are in parallel may be switched together by a shared, or respective synchronous, control signals.

Each said arm may comprise an array (not necessarily having a grid layout) having a number NS of rows and a number NP of columns of said switching cells, wherein the numbers NS and NP are one or more (and may or may not be equal), wherein each said column comprises a series connection of said switching cells coupled between a said power rail and the converter output, wherein the method comprises less than or equal to NS×NP said steps to generate the said voltage profile. Different rows may have different values of NP. The voltage profile at the output preferably varies between a voltage of one said power rail and a voltage of the other said power rail. In such an embodiment, only switching losses may be incurred in the auxiliary switches.

Sequences of switching the cells in either or both arms to provide the step(s) may determine the shape of the voltage profile. Thus, in order to limit for example a rate of change of voltage on a phase output, the method may comprise determining a switching firing pattern of the switching cells according to a (preferably desired maximum) dv/dt value of a voltage profile transition, e.g., square wave edge.

Preferred embodiments are defined in the appended dependent claims.

Any one or more of the above aspects and/or any one or more of the above optional features of the preferred embodiments may be combined, in any permutation. Furthermore, any of the above methods may be provided as corresponding apparatus, and vice versa.

BRIEF DESCRIPTION OF THE DRAWINGS

For a better understanding of the invention and to show how the same may be carried into effect, reference will now be made, by way of example, to the accompanying drawings, in which:

FIG. 10 shows an example of edge profiling for dv/dt control and/or EMI reduction. Left, upper: three different dv/dt slopes using different step rates; right, upper: rounded edges to reduce EMI. Lower: dv/dt filter added to phase output;

DETAILED DESCRIPTION OF PREFERRED EMBODIMENTS

The active snubber concept as implemented in embodiments may be considered a cellular concept, preferably (i.e., optionally) allowing series and/or parallel operation of switching cells. It may be applicable to Wide Band-gap (WBG) devices, and thus may have the potential to ease their adoption in power converters.

In order to assist understanding of the active snubber concept, we firstly consider inductive (hard) switching.

Figure 1:
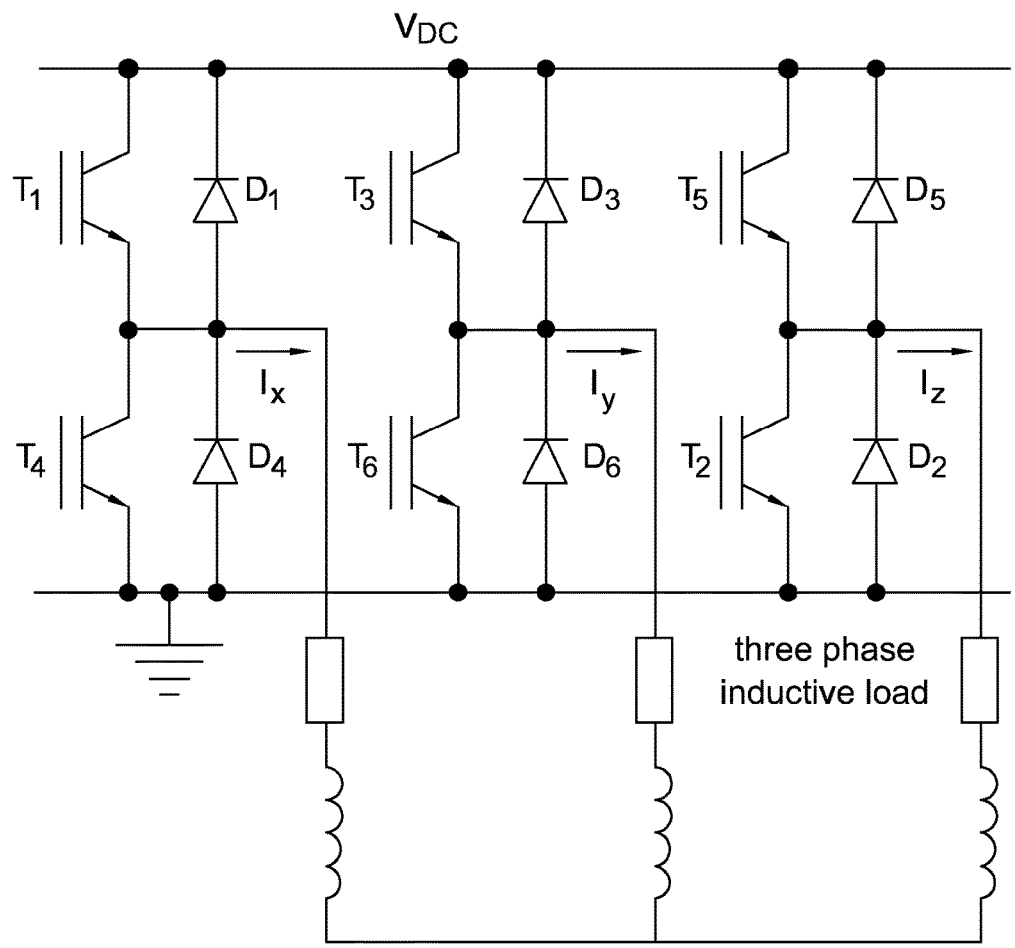
FIG. 1 shows a simplified representation of a three-phase inverter bridge. The DC link voltage VDC may be stiffened by connected a suitably large capacitance across it, CDC (not shown). Each pair of devices—T1 & T4, T3 & T6, T5 & T2—is termed a phase leg or half-bridge leg. IGBTs are shown here for T1-T6, but could be replaced by, e.g., BJTs, JFETs, MOSFETs, HEMTs and/or GTOs/GCTs.
Figure 2:
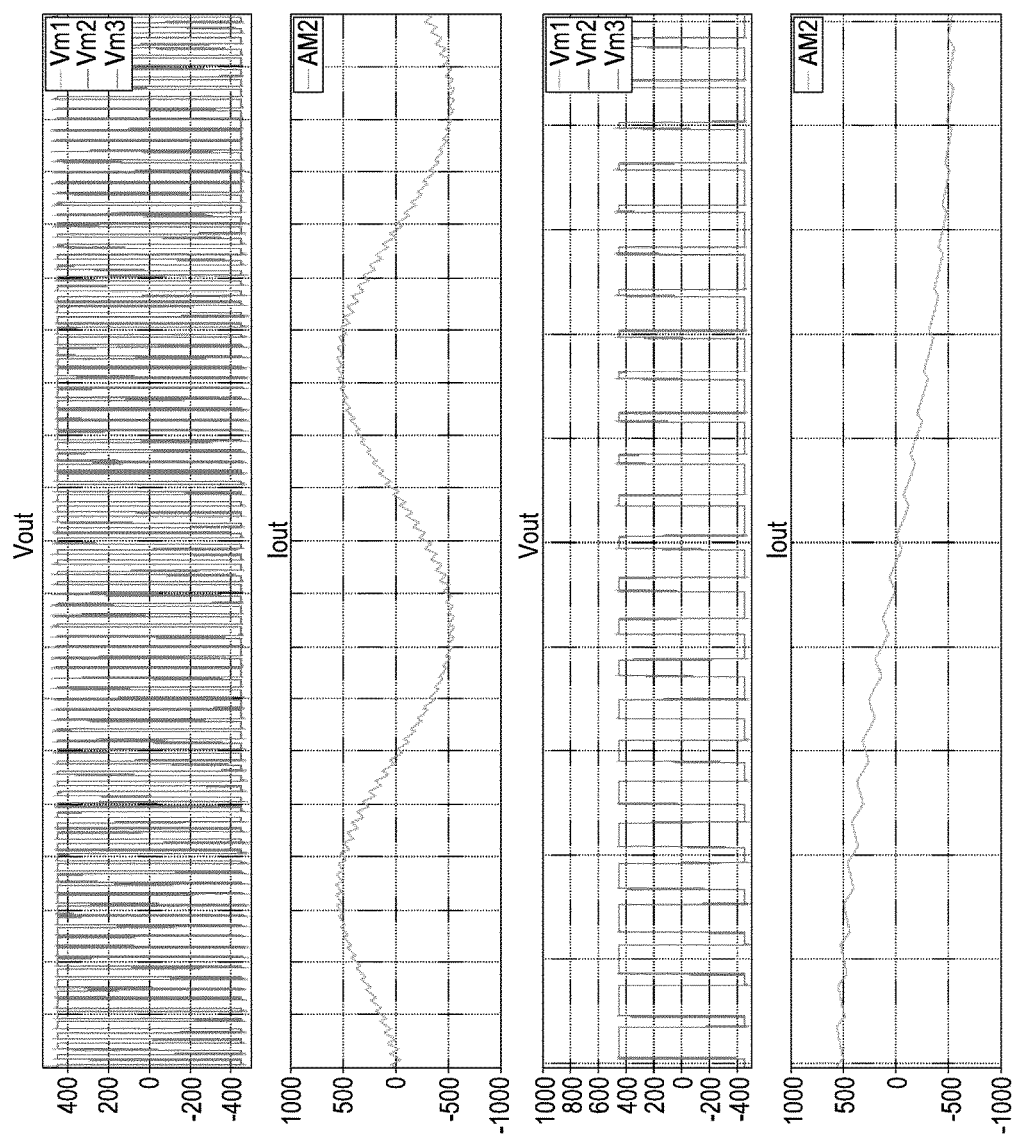
FIG. 2 shows an example of PWM used to generate a sinusoidal load current in an inductive-resistive load, shown for one phase leg. The lower plots are a zoomed-in portion of the upper plots.

In the vast majority of power converters, a square wave voltage is generated from a fixed DC supply (e.g., capacitor bank) using power semiconductor switching devices, such as BJTs, IGBTs, MOSFETs, JFETs, GTOs or HEMTs. This square wave is applied to an inductive-resistive load to generate a relatively smooth current, whether AC or DC. Generally, at the switching frequency used, the load will appear mostly inductive, thus the current in it may respond only to the average of the square wave. See FIG. 1 for a simplified representation of a three-phase inverter bridge, with FIG. 2 showing typical voltage and current waveforms for a single phase leg (sinusoidal PWM).

When an active switching device (Tx) turns off, the current flowing through the load continues to flow due to its inductive nature. Therefore, a freewheel diode (Dx) on the opposite side of the phase leg turns on to provide a current path to the opposite DC supply rail. When the switching device turns back on, the freewheel diode turns off.

Commutation between the upper and lower devices in a phase leg at a switching event gives rise to switching losses, since for a small period of time both high voltage and current are present in one or both switches. The longer this period of time, the greater the energy dissipated in each switching event. The average switching power losses are simply the switching energy losses (turn-on and turn-off) multiplied by the square wave switching frequency. This forms a significant part of the power losses from the bridge, the other part being conduction losses (voltage drop across each switch with current flowing in the on-state).

The rate of current commutation between devices at a switching event (di/dt) clearly affects switching losses, as discussed above. Additionally, it gives rise to potentially damaging voltage overshoot arising from commutation loop inductance. This commutation loop comprises the DC capacitance, freewheel diode, active switching device, and conductors connecting these components. The inductance of this commutation loop—frequently termed the stray inductance or commutation/loop inductance—is determined by loop area enclosed by conductors, e.g., the length multiplied by the separation. Each component (capacitor, diode, switch) has its own internal inductance, with the conductors being designed to add the minimum additional inductance on top of this; laminated busbars may be used between the switching devices and DC capacitance to achieve this.

In any power converter design, there is generally a trade-off between switching speed (hence switching energy losses) and DC link (supply) voltage: as the switching speed increases, to reduce the switching power losses, the voltage overshoot caused by the stray inductance increases, thus requiring more headroom above the DC link voltage and device (e.g., diode and switch) breakdown voltage. Reducing the stray inductance is desirable to maximize use of the DC link voltage while minimizing switching power losses.

Traditional silicon (Si) devices used in power converters are MOSFETs for low-voltage applications (typically breakdown voltages up to 600 V) and IGBTs for voltages above this (breakdown voltages in the range 600 V-6500 V). IGBTs switch more slowly than MOSFETs (hence have greater switching energy losses), because they are bipolar devices while MOSFETs are unipolar devices; however 600 V is generally a point above which MOSFET conduction losses may excessively dominate the overall power dissipation, making IGBTs generally the device of choice above this voltage rating.

Wide band-gap devices—e.g. silicon carbide (SiC) MOSFETs and gallium nitride (GaN) HEMTs—have the potential to reduce greatly both the conduction and switching losses compared with Si devices. These semiconductor materials have a much lower specific on-state resistance, giving reduced conduction losses per unit area for a comparable device in Si. Furthermore, because of their increased electric field strength, unipolar devices such as SiC MOSFETs—with their fast switching characteristics—are in principle competitive up to much greater voltage ratings than Si MOSFETs. Therefore, the specific power losses of a converter decrease, allowing a greater power density (smaller size for the same power rating) and/or a large potential increase in switching frequency. The latter is potentially advantageous because it can reduce the size, cost and/or losses of the rest of the converter, such as inductors, capacitors and resistors.

However, the application of wide band-gap devices to conventional converters is not straightforward. If WBG devices such as SiC MOSFETs or GaN HEMTs substitute existing IGBTs, for example, then typical stray inductances (tens of nH) coupled with the high switching speeds of the WBG device cause large di/dt rates and hence large voltage overshoot. This voltage overshoot is already a problem in existing IGBT-based converters, so increasing the di/dt by a factor of 5-10 may make the voltage overshoot high enough to either limit the current and/or destroy the device. Slowing down the switching of the WBG device reduces this, but may increase switching losses back to previous values typical of Si IGBTs, thus nullifying any benefit of WBG.

In view of the above, the successful utilization of WBG devices may hinge on greatly reducing the stray inductance of the commutation loop, allowing the increased switching speed—hence greatly reduced switching losses—to unlock the benefits of WBG technology.

In this regard, we now consider a switching cell concept.

Compact switching cells may extract maximum performance from fast WBG power semiconductor devices. A cell may comprise or be a single phase leg—i.e., an upper and lower switching device—and a local cell capacitor. The local cell capacitor does not replace the main DC capacitor, but may provide a low-inductance commutation path for device switching. This is shown in more detail in FIG. 3.

Very small commutation (loop) inductance may be achieved by Reclosing a physically small cell, with conductors preferably arranged in a strip line layout wherever possible to minimize the loop area. In order to achieve the small physical size, the switching cell preferably has a low current rating (e.g., tens of amps) and a low voltage rating (e.g., a few hundred volts); otherwise conductors and insulation distances may become too large, making the cell physically large. Another disadvantage of increased voltage rating is that the cell capacitor may become physically larger for the same capacitance value.

Values for switching cell loop inductances may be in the range of 0.5-5 nH. Even with very fast di/dt rates at turn-off associated with wide band-gap devices, voltage overshoot values such as 5% or below (relative to off-state voltage) may thus be achieved. Therefore, the use of a compact switching cell may allow very low switching losses combined with a high DC supply voltage (relative to the device breakdown voltage).

The cell capacitor is preferably not large in capacitance—in the range 1-10 pF—in order to maintain a small stray inductance. The energy storage function in the DC link is still provided by the main DC capacitors; therefore the conductors linking the cell DC supply to the main DC link may be relevant to minimizing interaction (oscillation) between the cell capacitor and main DC link capacitor.

We now consider application of the switching cells to large power devices.

To aid market adoption of WBG devices for higher power converters, e.g., using power modules with blocking voltages >600 V and current ratings >50 A, there is an advantage if devices are packaged in a familiar format: preferably, having an electrically-isolated baseplate on the bottom for heat conduction, and screw terminals on the top for connecting to device power terminals. Deviation from such packages used in converters with device ratings at and above 1200 V and 400 A may force converter designers to modify significantly their inverter bridge designs, which may pose a barrier to adoption. The limits of 600 V and 50 A may be within the reach of a single cell without making the cell stray inductance too large.

Another aid to market adoption is of course low cost.

Figure 4:
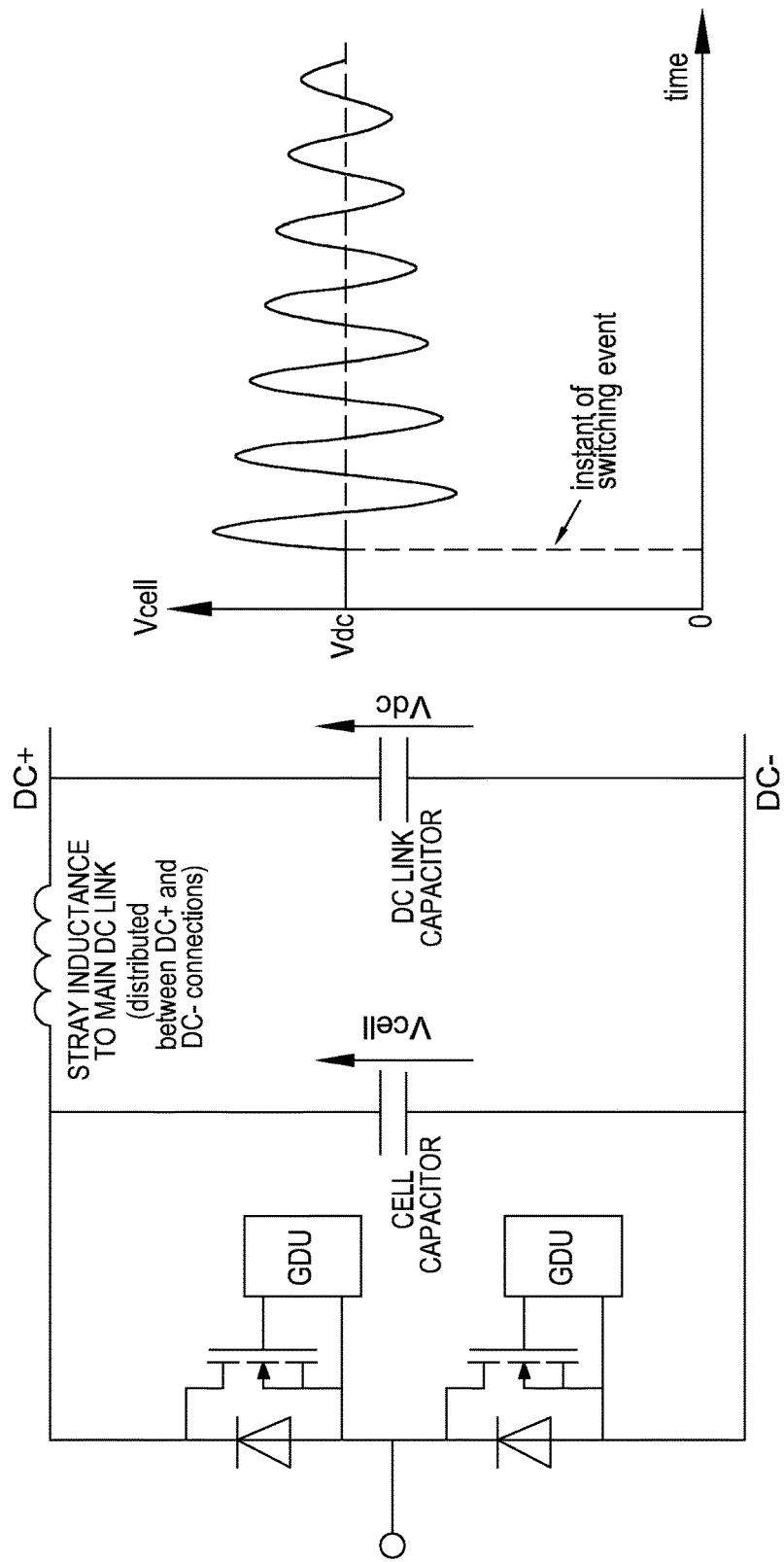
FIG. 4 shows interaction of the cell and DC link capacitor via connection inductance.

When making main DC connections between the switching cell and DC link capacitance, the inductance of this connection is of interest. Even a low-inductance connection from a well-designed existing device module through a laminated busbar may exhibit a loop inductance of approximately 30 nH (e.g., for high power converters using 1200 or 1700 V devices); this may therefore be considered a reasonable value for the inductance between a cell capacitor and the main DC link capacitor. Given that the DC link capacitor may be of the order of 1 mF and above, its voltage may be effectively constant during a switching event. The resulting oscillation may therefore be between the cell capacitor and the inductance between cell and DC capacitors, and this oscillation is preferably suitably damped to reduce/avoid overshoot and ringing (the latter an issue for electromagnetic interference (EMI)). FIG. 4 shows this more clearly.

Figure 5:
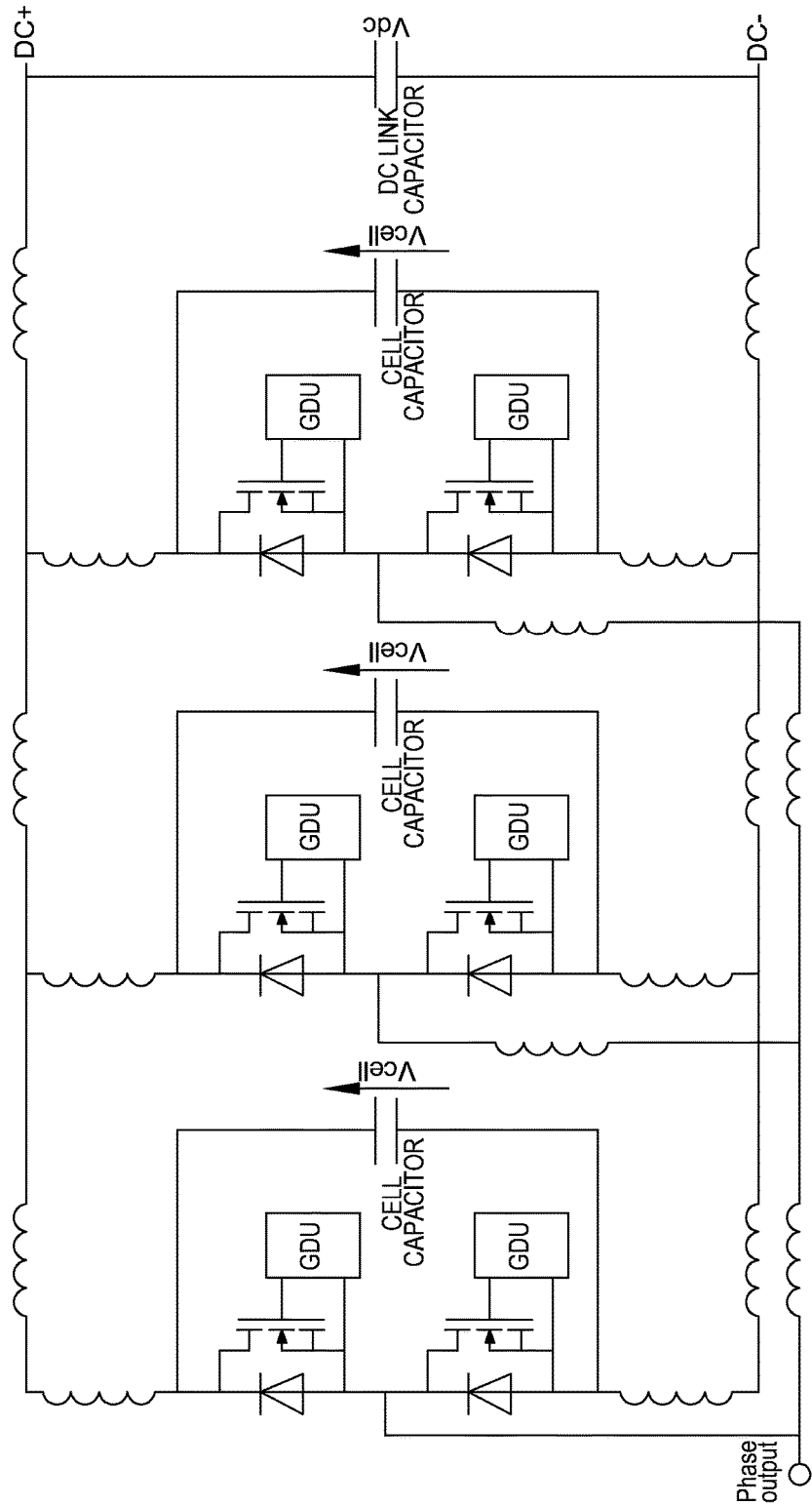
FIG. 5 shows inductances between hard parallel switching cells, which may give rise to oscillations between cells and/or potential current sharing imbalance.

For ratings above 50 A, it may be considered to simply parallel cells and switch them simultaneously. However, paralleled cells may have a further mode of oscillation in addition to that identified previously between cell and DC link capacitors, namely between parallel switching devices through the cell output inductance and DC connection inductance. This is analogous to paralleling chips inside an IGBT module, where inter-chip oscillations and/or dynamic current sharing can be difficult to control. In an IGBT module, internal gate resistances may be used to add damping at the expense of switching performance; oscillation may also be reduced through damping, because the differential resistance of parallel chips is high as they switch (since they are in the active region, i.e., high current and high voltage). Adopting many switching cells using WBG devices may give rise to similar oscillations but without any extra damping from extra gate resistances and, because the devices switch very quickly through the active region, with little or no damping from differential device resistance. This is shown in FIG. 5.

A further issue may be tolerance between devices. For example, there is a significant variation in threshold voltage for MOS-gated devices between device chips, which may further exacerbate parallel chip operation by affecting switching synchronisation and/or device transconductance.

The achievement of a high damping factor for these modes of oscillation may be dependent on a high damping resistance in series with the inductance (this may be impractical because of its power losses) and/or a damping resistance in parallel with the inductance (this may be difficult because the inductance is distributed). If the cell capacitance is increased, the series damping resistance becomes smaller; this may be advantageous because the inherent conductor resistance may now be suitable for damping, but the large cell capacitance may compromise the small size of cell. Another option is to increase the inter-capacitor inductance to make it lumped (discrete), such that it is possible to add a damping resistor; however this may only work for a single switching cell, as it may affect the performance of parallel switching cells.

Furthermore, if voltage ratings over 600 V are required, the use of series-connected devices or switching cells may ease insulation distances, thus maintaining a low commutation loop inductance. Achieving device ratings at 3300 V and greater, i.e., devices for medium-voltage converters, may therefore be realized using lower voltage parts.

In some applications, there is also an additional problem related to the fast switching speed of WBG devices, namely dv/dt. The rate of change of voltage at each edge of the square wave produced by a phase leg is generally a problem for motors and some inductors, because of the resulting current flowing through their insulation capacitance. Inverter-duty motors can typically cope with dv/dt values up to 3 kV/ps, which is higher than standard motors (typically 1 kV/ps).

However, even
conventional IGBTs can produce up to 7 kV/ps, while WBG devices are typically in the range 20-200 kV/ps. Therefore, WBG devices may require a dv/dt filter, with associated cost, size and/or losses. An alternative is to slow the WBG device switching speed down, but this may be back to IGBT switching speeds, removing any benefit of WBG devices.

Therefore a cell interconnection topology to allow adopting multiple switching cells in practical converters is desired, such a topology to preferably: (a) decouple cell capacitors from each other; (b) deliberately introduce inductance between parallel switching cells to improve current sharing (preferably without introducing oscillations); and/or (c) reduce the effective dv/dt at the phase leg output, for example to that of conventional Si IGBT modules.

In this regard, we now consider specific embodiments of an active snubber concept.

Figure 3:
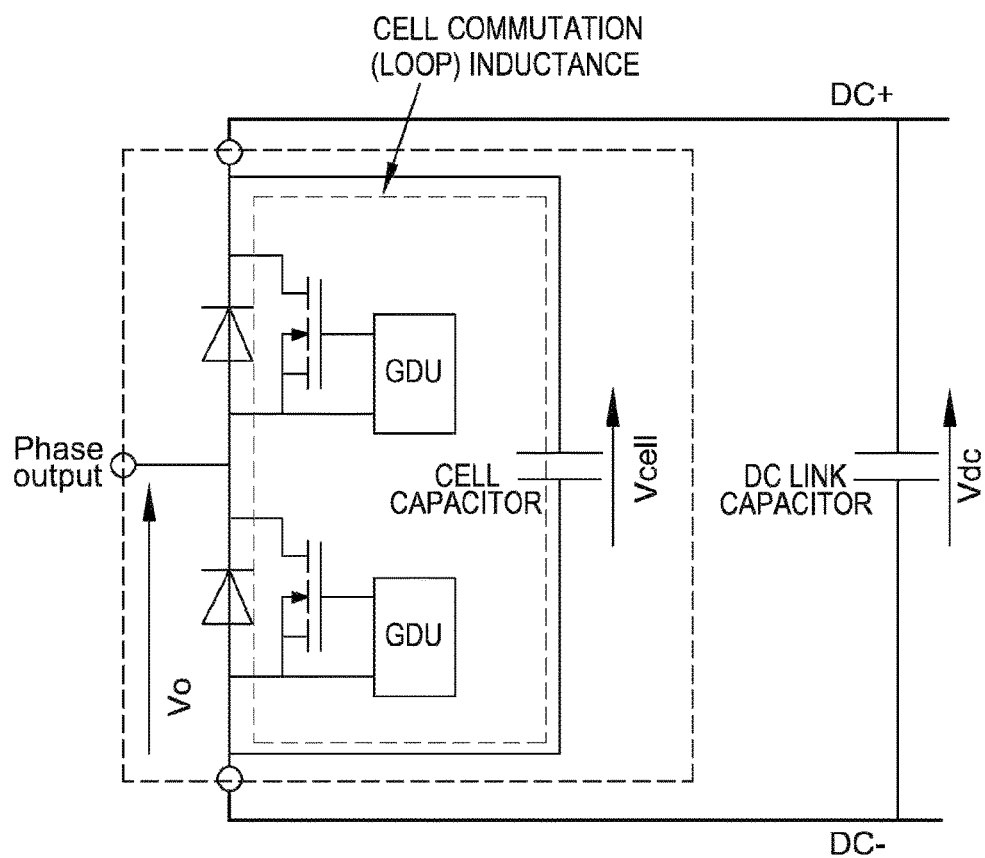
FIG. 3 shows an implementation of the switching cell concept, this may have a very low stray inductance realized through a compact layout.

An embodiment of active snubber topology may overcome limitation(s) of paralleling many switching cells while maintaining advantage(s) of WBG semiconductors, e.g., fast switching speed thus low switching energy losses. A basic embodiment may comprise multiple switching cells connected in series and parallel within a phase arm. Generally, connection of multiple switching cells such as shown in FIGS. 3-5 may be expected to result in undesirable oscillations between cell capacitances and inductances, e.g., stray inductances within the switching cell, power rails(s), load and/or in phase output connection(s) to the load. Nevertheless, it is now contemplated to series and/or parallel switching cells. Further details are described below; also see FIG. 6.

Regarding topology, multiple switching cells may be arranged in series and/or parallel within phase arms. Two phase arms are connected to form a phase leg (half bridge): one arm from phase output to DC+, the other from phase output to DC−. Switching cells may be connected in parallel within phase arms (see horizontal links in FIG. 6). Additionally or alternatively, switching cells may be connected in series into a sub-phase arm, with these then connected in parallel at the phase output (the horizontal links omitted).

Figure 6:
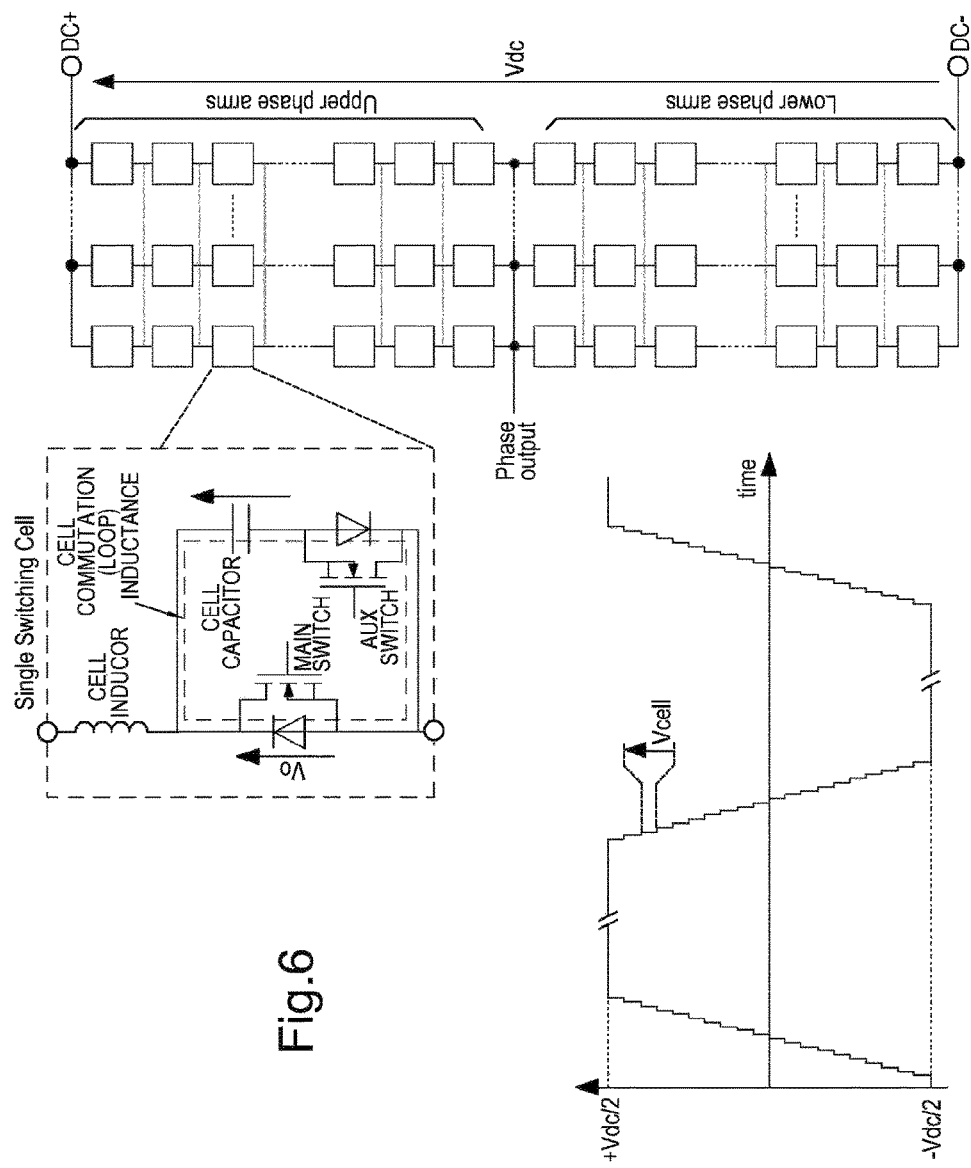
FIG. 6 shows a basic schematic of an example active snubber device module, e.g., power converter. The module is shown merely for example as comprising a phase leg comprising lower and upper phase arms, the phase leg coupled between first power rail DC+ and second power rail DC−. Regarding the single switching cell as shown comprising a series connection having the cell capacitor and AUX switch, it is noted that the cell capacitor and auxiliary ('AUX') switch may be transposed in a switching cell. The power switch of the cell is labeled as a 'MAIN' switch. First and second bypass circuits are shown in the form of diodes across the MAIN switch and AUX switch, respectively. Control input line(s) (not shown) may couple to the gate terminal of the main switch and/or that of the auxiliary switch, albeit preferably via a drive circuit (not shown; e.g., gate driver unit GDU—see FIG. 8). A resulting phase output square wave, also shown in FIG. 6, may have the same frequency as that in a conventional half bridge device module. A load may be connected directly to the phase output (albeit by, e.g., connectors, wires, tracks, etc., which may have significant stray inductance)

Each switching cell may comprise two actively controlled switches, each with its own anti-parallel diode (or equivalent behavior provided by the switches), and a DC cell capacitor supporting a voltage VCELL. The power switch (MAIN) and auxiliary switch (AUXILIARY; AUX) are switched in a complementary fashion: when MAIN is on, AUX is off and vice-versa. This may allow each switching cell voltage, Vo, to switch between a voltage of 0V and +VCELL, while still allowing current to flow in either direction. (Note that a small "dead time" period may be implemented to delay a main and/or auxiliary switch turning on, to avoid shoot-through conduction; this time may be dependent on the switching speed of the devices (switches)). FIG. 6 shows this in more detail.

Switching cells may be switched in a series of steps to build up a square wave voltage at the output of the converter, as shown in FIG. 6. Cells in each arm of a phase leg may be switched in opposition, i.e., are complementary, e.g., cell number k of the upper arm may be switched from 0 V to +VCELL when cell k of the lower arm is switched from +VCELL to 0 V. In this way the total voltage across the phase leg is generally constant at VDC=NS×VCELL, where NS=number of cells in series in each arm. The voltage across the cell capacitor may remain approximately constant during operation.

Each switching cell preferably has a series inductance, called the cell inductor. This may effectively give the cell an inductive load to switch into, in embodiments allowing a voltage difference between cells for short periods of time without introducing a significant change in current. In other words, the cell inductors may: (a) allow hard switching to take place in each cell; and/or (b) absorb the difference in volt-seconds arising from timing skew between complementary cells in the upper and lower arms. It is proposed that the cell inductor and/or cell capacitor sizes are determined on the basis of, e.g., calculated from, the range of external loop inductances expected (e.g., through the main DC link capacitor bank). Considering how cell component values might be related to external inductance values, a combined inductance across all cells (equal to (Ns/Np)×Lcell for an array) may have a magnitude substantially the same as or greater than the external loop inductance through the DC link and main DC capacitor bank of an embodiment.

Generally a power supply may have significant inductance in at least one connection from a phase leg to a main storage (DC link) capacitor. In arrangements, such inductance may be found, e.g., in a connection from a power switch to a corresponding capacitor of a capacitor bank. The external inductance may be of the order of, e.g., 30 nH. (In a converter embodiment, the external inductance through the DC link and DC cap bank may depend on the voltage rating of the converter: generally, the bigger the voltage rating the bigger the loop inductance. For a converter with 1200 or 1700 V devices, it may be approx. 30 nH, but with a converter using 4500 or 6500 V devices it may be much higher (sometimes >100 nH)). Undesirable LC oscillations due to such inductance may however be reduced by the provision of distributed inductance, i.e., by means of the multiple cell inductors of a plurality of switching cells. Each such cell inductor may have similar inductance as an external inductance, e.g., 10 nH or 30 nH.

Parallel switching cells may be switched in different ways, e.g.: (i) all parallel cells may be switched simultaneously; (ii) parallel cells may be switched individually. (This may apply to any two or more parallel cells and thus may apply to all cells of an embodiment). Option (i) is generally not the same as hard-paralleling cells as described above in relation to application of switching cells to large power devices, since the cell capacitors are not connected directly in parallel; also the cell inductors may facilitate current sharing between cells (inductors may aid sharing of parallel cells by providing a means to absorb differences in volt-seconds between cells. This difference may occur if the cell capacitor voltages are not identical and/or the timings of cell switching are not identical. Generally, the larger the inductance, the smaller the resulting current difference between cells in an embodiment). Option (ii) may allow interleaving of parallel cells, giving a further sub-division of the voltage step profile, e.g., an increase in number of steps from NS to NS×NP (where NP is the number of cells in parallel).

The firing pattern of switching cells as each switching edge progresses may be controlled to balance the cell capacitor voltages and/or cell inductor currents. (Such a firing pattern may correspond to a sequence of switching on and off cells of an embodiment, e.g. series and parallel cells such as may be found in an array of NS×NP cells. Each step of the firing pattern may switch one or more parallel and/or series cells of an arm on and one or more such cells of the other arm of a phase leg off). In an embodiment, the cell voltage and/or inductor current may be monitored by a local measurement circuit and communicated to a central controller. The central controller may calculate the mean and communicate it back to the cell. In an embodiment, the order of switching may change from a first edge of an output voltage profile (e.g., low to high) to second edge (e.g., high to low, preferably immediately subsequent to the first edge) in order to achieve this. The second edge may occur after the HIGH time duration following the first edge. In an embodiment providing a substantially square wave phase output, the HIGH (LOW) time duration may depend on the duty ratio of the square wave for that particular switching cycle.

Considering operation of switches during different parts of a voltage profile such as a square wave, in each switching cell of an arm of a phase leg only the MAIN device connected between the cell terminals may carry conduction current during the time between output voltage edges, e.g., a time when all cells in the arm are at –0V (i.e., have –0V across them because their MAIN devices are ON). The AUX device connected in series with the cell capacitor in the switching cell may only carry current when the cells of the arm are ramping (stepping) through an edge, since when all cells in the arm are at Vo=VCELL (the MAIN devices being OFF) the phase output is connected to the opposite polarity, i.e., coupled to a power rail through the other arm. Thus, in an embodiment the MAIN device(s) may see switching losses and conduction losses, while the AUX device(s) may only see switching losses. (Though if in an example embodiment a phase leg output doesn't swing all the way to the DC rails (Ns×Vcell) then there are generally still one or more cells with the auxiliary switch and cell capacitor switched in in both arms, potentially giving conduction current flow through these. This may give rise to significant auxiliary switch conduction losses and/or significant cell capacitance requirement, respectively). Subject to saturation current and/or thermal resistance limitations, the AUX device may therefore be physically much smaller than the MAIN device. Similarly, the cell capacitors only carry current through an edge, so may also be small, thus maintaining the small physical size of the switching cell. The sizes of each cell capacitor may depend on the current and/or voltage rating of the cell. For example. 1-10 uF may be suitable for a cell voltage of 200 V and/or cell current rating (power switch, i.e., main device) of about 300 A.

A consequence of the previous paragraph may be that the AUX device and cell capacitor effectively provide a snubber action across the MAIN device in a switching cell. This is what gives rise to the term "active snubber".

(In embodiment, the maximum phase output from a phase leg may not reach +NS×Vcell and/or −NS×Vcell, e.g., alternate between +/−NS×Vcell (where NS is the number of switching cells in an arm of a phase leg, preferably the same in both arms). Thus, the phase output may have smaller amplitude than the maximum possible with a particular value(s) of NS. However, if the phase leg output doesn't swing all the way to +NS×Vcell and/or −NS×Vcell, then current may still flow through the remaining cell capacitors not switched out by the power switches (main devices) in an arm, with the auxiliary switches corresponding to those cell capacitors being on. Hence, conduction current may flow through both the auxiliary switches (this may lead to conduction losses in addition to switching losses) and the cell capacitors (this may results in a requirement for very large cell capacitors in order to avoid large voltage changes on the cell capacitors). Thus, a preferred mode of operation is where the maximum phase output from a phase leg alternates between +/−NS×Vcell. Preferably, the phase leg output swings all the way to NS×Vcell at each edge/transition of the output voltage profile, i.e., every cell in each arm switches.

Figure 7:
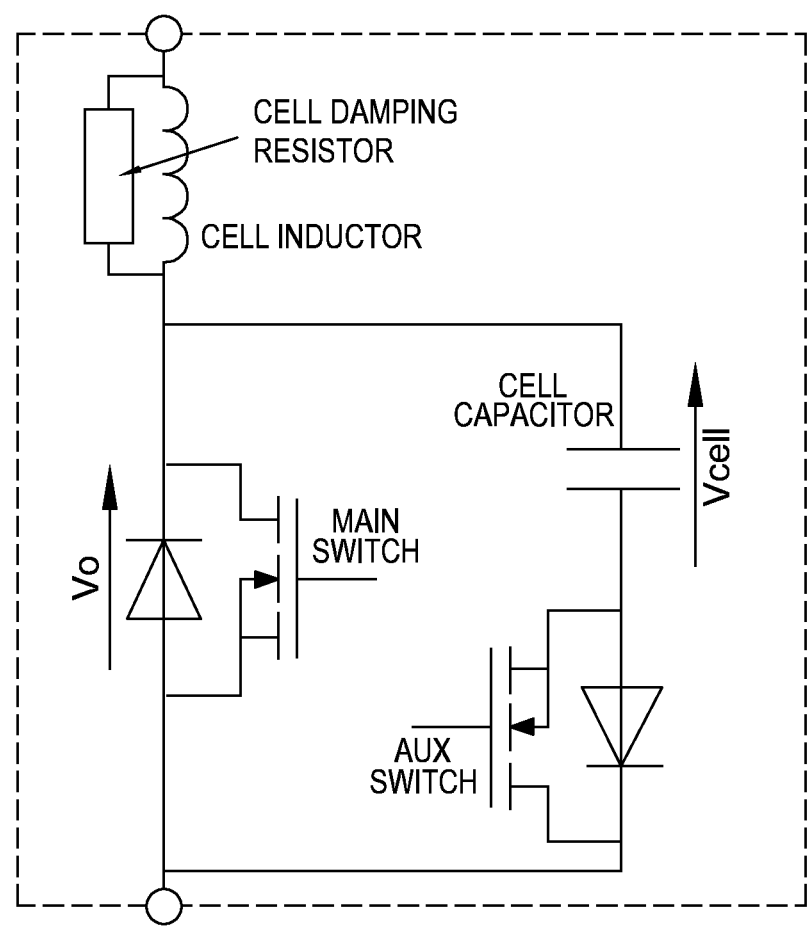
FIG. 7 shows damping resistors connected in parallel with cell inductors.

The cell capacitors are preferably isolated from each other and the DC capacitor, for example by the cell inductors, thus minimizing the opportunity for oscillations. Interaction may thus be determined, generally reduced, by the cell inductors, with optional parallel damping resistors as appropriate (see FIG. 7), and/or by the firing pattern. (Note that the damping resistors dissipate very little power on average). The values of the cell inductors may for example be such that, in one embodiment, a combined inductance across all cells of a cell array (equal to (Ns/Np)×Lcell) is similar in magnitude to or larger than the external loop inductance through the DC link and main DC capacitor bank. Regarding values of the optional damping resistors, the damping resistance in parallel with each cell inductor of an embodiment is preferably approximately equal to: Rcell=sqrt(Lcell/Ccell). This is generally based on critical damping of LC oscillation.

Generally speaking, commutation takes place only within each cell, so a low-inductance commutation loop may only need to be realized within each cell, not across the whole arm.

The switching cells may, for example, consist of low-voltage WBG devices, although embodiments are not restricted to the use of such devices. Each cell capacitor of a cell may be mounted close to the devices (e.g., switches and optional diode(s)) in the cell, potentially giving a very small commutation loop inductance. This may allow sufficiently fast switching (e.g., rise and/or fall times of 10 nanoseconds or less, for each power switch, i.e., main device) to take advantage of high speed WBG devices. However, the switching frequency of the cells would be equal to the square wave (PWM) frequency in an embodiment.

Separate freewheel diodes are not required, for example if FET-type devices (e.g., power switch(es) or auxiliary switch (es)) are used, e.g. Si or SiC MOSFETs, or GaN HEMTs. Such devices may: (a) have integral body diodes or equivalent behavior; and/or (b) be usable in reverse conduction mode, e.g., as used in synchronous rectification. Regarding (b), a device may allow reverse current flow through the channel when in the on-state. Omission of any freewheel diode may save on packaging space.

In an embodiment, because the commutation loop inductance—and thus voltage overshoot—may be very small within each cell, the cell capacitor voltage could be very close to the breakdown voltage of the cell switching devices, e.g., the breakdown voltage of the main switch. Therefore, the DC link voltage of an embodiment could be closer to the combined breakdown voltages of the cells (NS×VBR), with an allowance for cell voltage mis-match, i.e., where not all cell voltages are identical. This may result in either a greater DC link voltage for a given breakdown voltage, and/or smaller conduction losses for the same DC link voltage. Preferably a margin for such mis-match is provided, so that if the cells of an embodiment mis-share voltage a little then the cell with the largest voltage may not exceed the main switch breakdown voltage rating VBR. Compared to, for example, IGBTs having a maximum DC link (off-state) voltage of about 70% of the breakdown voltage if the loop inductance is low, an embodiment may however aim to reach, e.g., 90% of the breakdown voltage.

Figure 8:
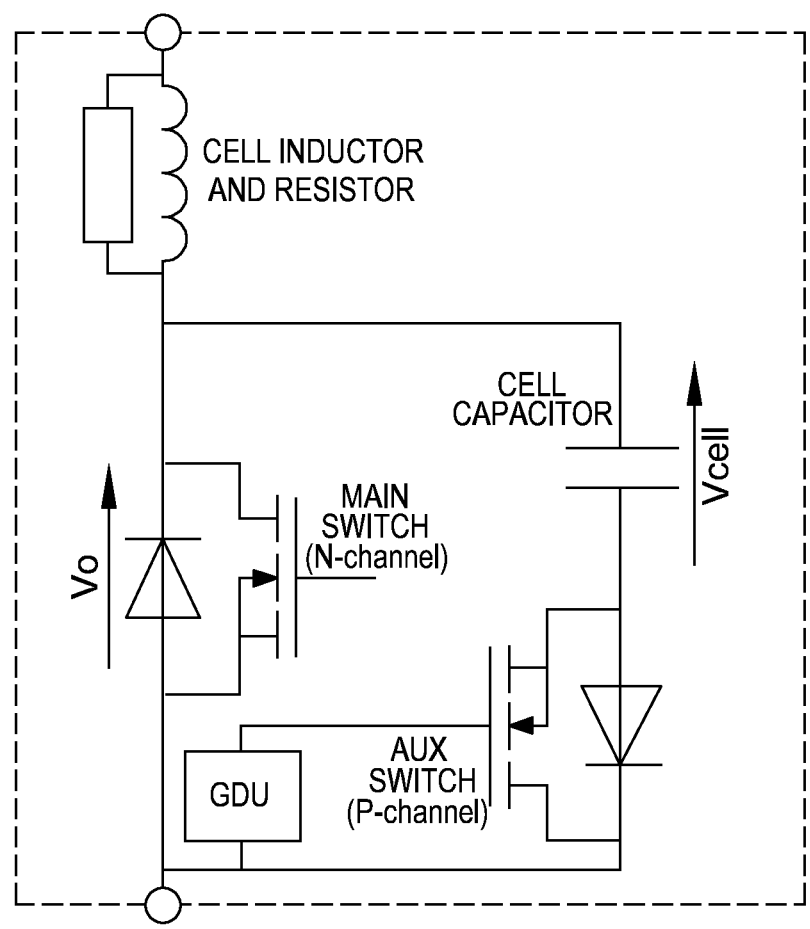
FIG. 8 shows adoption of a single drive circuit, e.g., gate drive (GDU), for a switching cell using a P-channel AUX device. In this case the GDU may be configured to receive a single control signal on a GDU input (not shown). An optional resistor is shown coupled across the cell inductor.

Each cell may have two small gate drives, one for the MAIN device and one for the AUX device. Alternatively, an N-channel device may be used for the MAIN switch and a P-channel device for the AUX switch, allowing a single gate driver to be used (referenced to the source terminals of the two switching devices). This is shown in FIG. 8. (P-channel devices are not usually used for power devices because their resistance is approximately 3 times that of N-channel devices due to the difference in mobility between electrons and holes; however in this application the conduction characteristics of the AUX device may be of less interest).

A suitable communications network may be implemented to communicate with and control the switching pattern throughout all the cells in the phase leg module.

Figure 9:
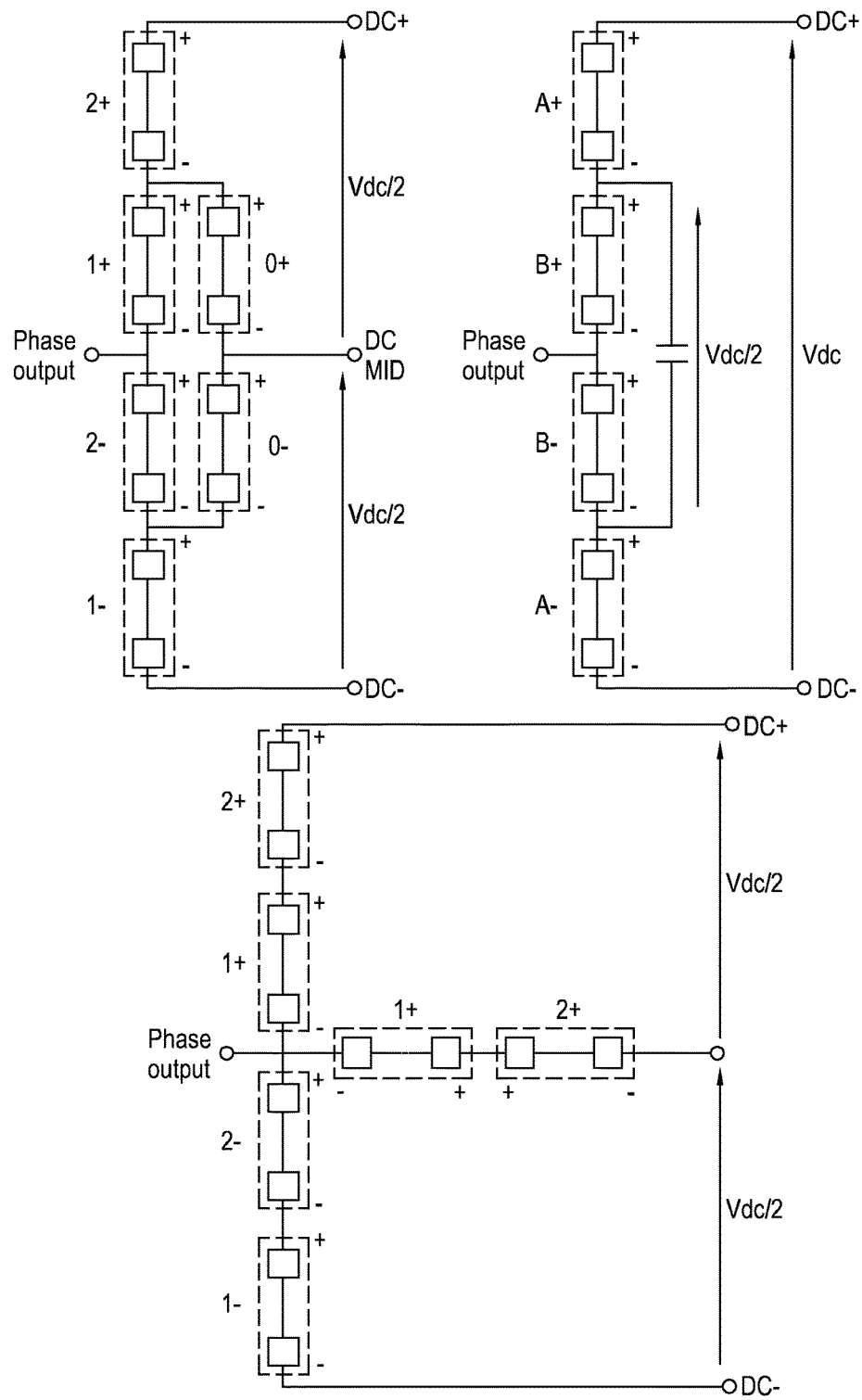
FIG. 9 shows example realization of multilevel topologies using an active snubber technique, shown for a 3-level phase leg. Specifically, (i) top left—neutral point clamped type 1 (I-type, or diode-clamped); (ii) top right—capacitor-clamped (or flying capacitor); (iii) bottom—neutral point clamped type 2 (T-type, or neutral point pilot), wherein '+' and '−' refer to positive and negative ends of the cells, i.e. main switch drain and source respectively, and/or the positive and negative ends of the phase arms.

A complete phase arm of an embodiment may be considered to be equivalent to a single switch in a conventional phase leg. Therefore, "single switch" devices based on the active snubber topology—to replace single IGBTs, for example—may be realized too by simply packaging a phase arm. This equivalence may additionally or alternatively allow multilevel converter circuits (e.g. Neutral Point Clamped types 1 & 2, or Capacitor-Clamped) to be realized using the active snubber topology, see for example FIG. 9. It is noted that an active nubber-based phase arm may effectively replace a single device in a multidevel phase leg in an embodiment, with the phase arms undergoing complementary switching similarly as single devices of a conventional phase arms.

To drive any power and/or auxiliary switch(es) of an active snubber embodiment, preferably any square-wave switching scheme may be used, e.g.,: sine-wave PWM, space-vector PWM, third harmonic injection PWM, discontinuous PWM, hysteresis control, sliding-mode, etc.

Given the presence of cell inductors, the requirement for low inductance between switching cells and the main DC link capacitors may be eased. This may allow conventional power module packaging to be used, including screw terminals. It may be possible for the packaging inductance to be greater than that of a conventional IGBT module.

An active snubber phase leg module may be implemented in a standard phase leg device package, e.g., EconoDual™ or PrimePack™. Power connections to the active snubber module would therefore be identical to an existing phase leg module: DC+. DC− and phase out. Each module may include two phase arms (an upper and lower), each for example containing NS×NP switching cells. Each switching cell may have MAIN & AUX devices, a cell capacitor, a cell inductor and preferably suitable gate drives. The module preferably further comprises a gate drive communication structure. Power for each gate drive may be harvested from the cell capacitor(s) (if there is enough energy storage in the cell capacitor) and/or from the cell inductor(s), supplied separately via isolated supplies, and/or supplied from boot-strap-type circuits (possibly from an adjacent cell).

A transition of a voltage profile on the phase output, e.g., a square wave edge, may be made up from many steps each equal to the cell capacitor voltage (or smaller if parallel cells are interleaved). Consequently, the transition or edge can in an embodiment be profiled to meet user requirements, e.g. not to exceed 1-3 kV/us as in an example withstand rate for a load with insulated windings. The average dv/dt of the switching edge may then be set with reduced, or no, effect on switching losses; this may be advantageous for motor drives for example.

Additionally. or alternatively, a very small dv/dt filter may be added to the phase output, as shown in FIG. 10, to smooth the stepped phase output. (Note that this dv/dt filter may be much smaller than that required for a conventional half-bridge phase leg because the filter may only be designed to filter out a voltage VDC/N for a time Tribe/N, not a VDC for a time Tribe (Tribe being a total time duration of the voltage profile transition)). The power dissipation resulting from using such a dv/dt filter may be of the order of 1-10 Watts, not hundreds of Watts. Furthermore, the switching edge corners, when the phase leg is starting and finishing a switching edge transition, can in an embodiment be rounded easily to reduce EMI. These effects are shown in FIG. 10.

Where the cell capacitors and/or the cell capacitor voltages are equal, there may be a linear voltage gradient from DC+ to phase output and phase output to DC− terminals. This may aid packaging of the active snubber module, by minimizing space set aside and/or occupied for insulation, e.g., creepage and/or clearance.

Preferably all switching cells dissipate the same power losses and/or the cell voltages and currents are balanced, in which case there may be uniform heat dissipation across all switching cells. This may be of advantage when packaging an active snubber device module.

Figure 11:
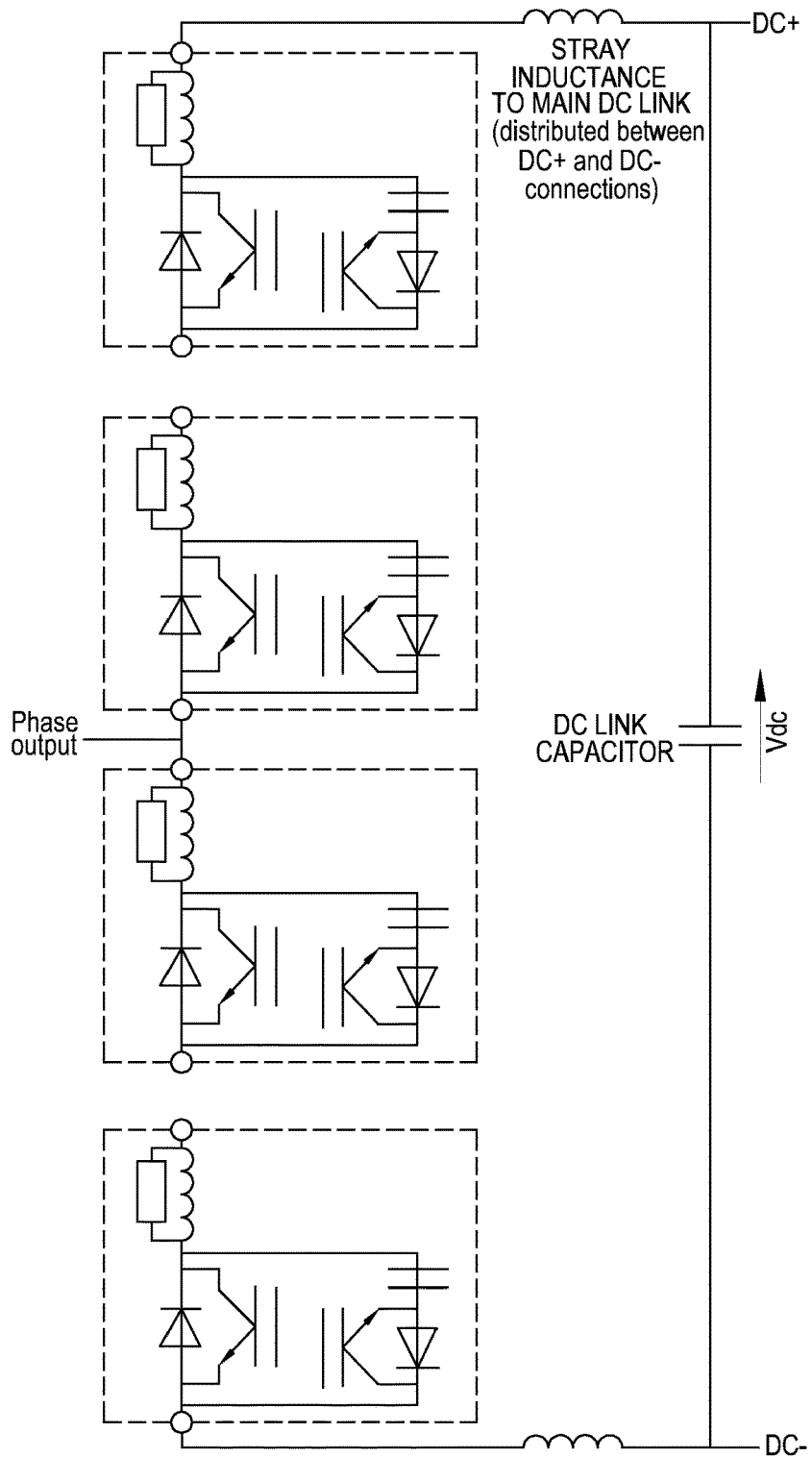
FIG. 11 shows an example of series connection of IGBTs using active snubber technology.

The active snubber technique may be applied for series connection of IGBTs, for example as shown in FIG. 11. In this configuration, each series-connected IGBT may have its own cell capacitor, cell inductor and AUX IGBT. The active snubber technique may then allow, in the same way as for the WBG devices, the phase leg voltage to be stepped through a voltage profile transition such as a square wave edge. Again, the cell inductor size may relate to, e.g., be determined on the basis of, the extra loop inductance through the DC link capacitance.

Figure 12:
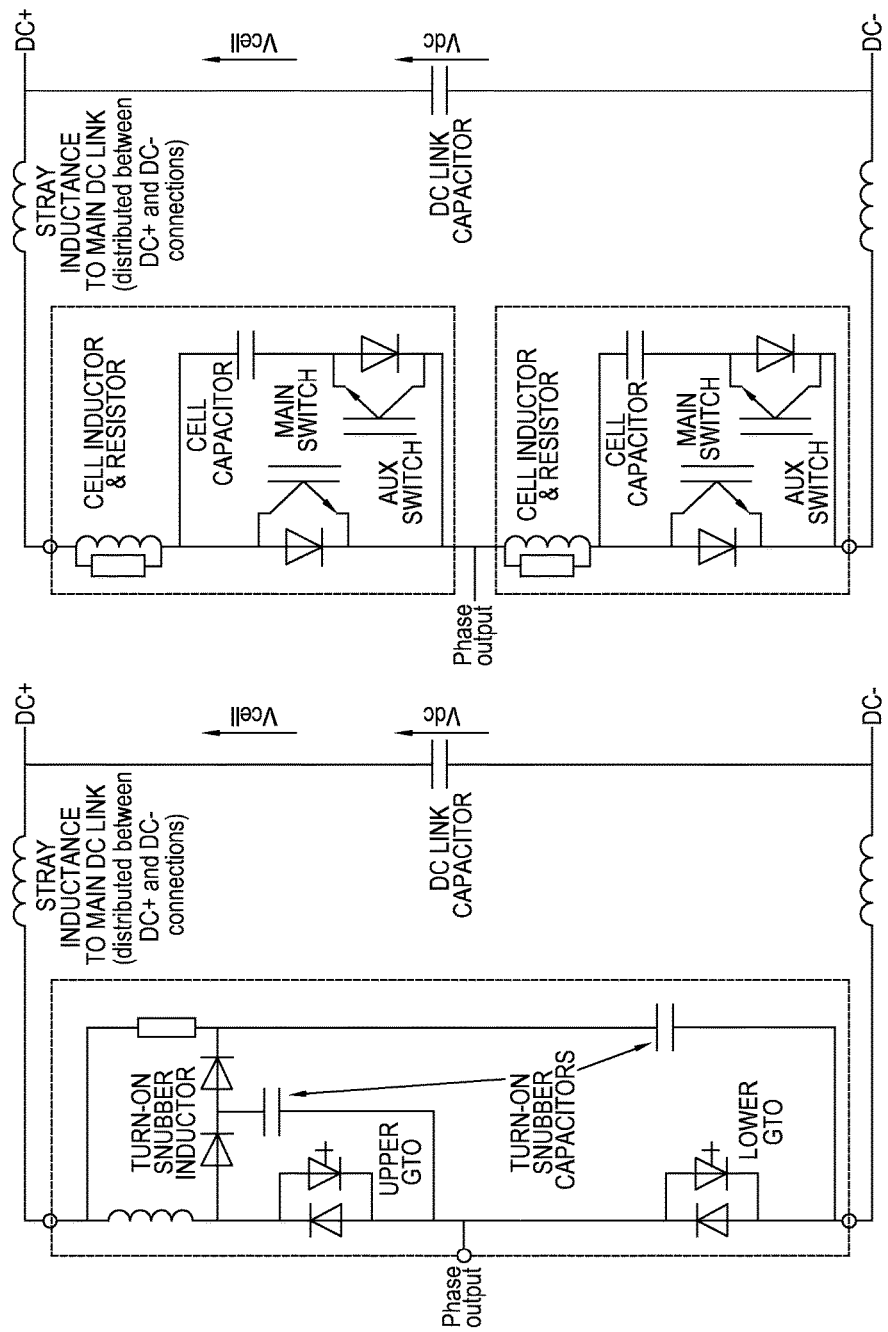
FIG. 12 shows an example of applying active snubber to replacement of GTOs with IGBTs. This may allow large stray inductances (between phase leg and main DC link capacitors) to be accommodated with IGBTs, in embodiments avoiding large voltage overshoots on the IGBTs and/or maintaining fast IGBT switching speed. Left: original GTO phase leg (Undeland snubber shown), right: replacement IGBT phase leg using two active snubber switching cells.
Figure 13:
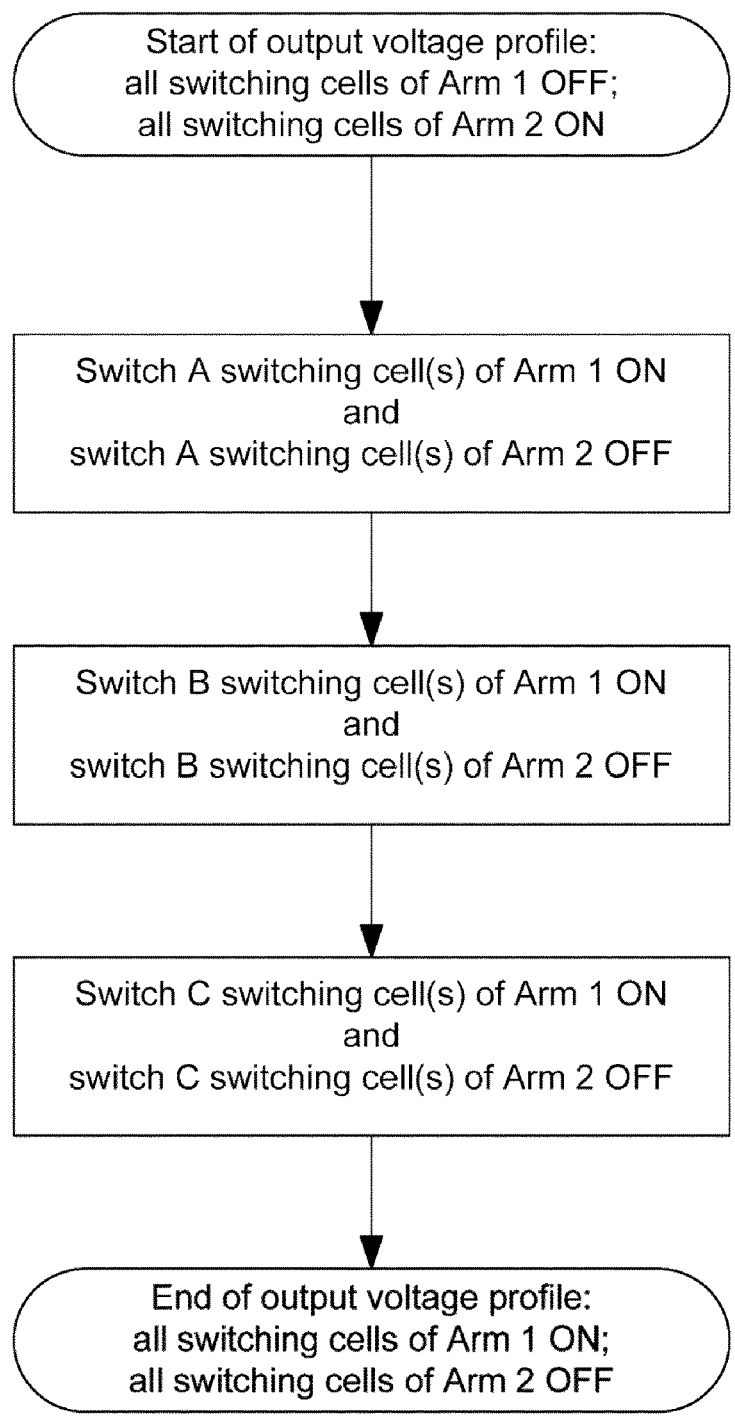
FIG. 13 shows an example method of controlling a power converter to drive a load, the power converter having at least one phase leg coupled between two power rails, the phase leg comprising two arms (1, 2) each having a plurality of switching cells, the arms coupled at an output of the converter. The switching of A, then B, then C switching cells in each arm (the steps for B C may be omitted or supplemented with steps for D, E, etc.) may allow an output voltage profile such as a ramp and/or transition of a square wave to be built up.

The active snubber technique may be applied for replacement of Gate Turn-off Thyristors (GT0s) within legacy converters by IGBTs. As shown in FIG. 12, a GTO phase leg generally has a turn-on snubber inductor to limit the di/dt through the thyristor at turn-on. The stray inductance to the DC capacitors may then not be critical. Direct replacement of GTO phase leg(s) by IGBT phase leg(s) (without snubbers) is a potential issue because the remaining stray inductance to the DC capacitors may be large compared to that expected for IGBT designs. Therefore, active snubber switching cells may be utilized to cope with the large stray inductance, avoiding large voltage overshoots on the IGBTs and/or maintaining fast IGBT switching speeds.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. Switching cells for phase legs of a power converter, the switching cells comprising:
   a power switch for conducting a current for driving a load;
   a series connection comprising an auxiliary switch and a cell capacitor coupled in series, the series connection coupled in parallel with the power switch;
   a cell inductor coupled to a coupling of the power switch and the series connection; and
   a commutation loop to conduct a commutation current arising from turn-off of the power switch, the loop comprising:
   a first bypass circuit for blocking current flow in a first direction and coupled in parallel with the power switch to conduct the commutation current in another, direction opposite the first direction;
a second bypass circuit for blocking current flow in a second direction and coupled in parallel with the auxiliary switch to conduct the commutation current in a direction opposite the second direction; and
the cell capacitor;
at least one control input line for receiving a control signal and configured to drive a control terminal of the power switch and a control terminal of the auxiliary switch; and
a series connection of the switching cells, each switching cell of the series connection being coupled to an adjacent one of the switching cells by a respective one of cell inductors.

2. The switching cells of claim 1, wherein at least one of the first and second bypass circuits comprises an extrinsic diode.

3. The switching cells of claim 1, wherein the first and second bypass circuits comprise an intrinsic diode of the power switch as the first bypass circuit or an intrinsic diode of the auxiliary switch as the second bypass circuit.

4. The switching cells of claim 1, further comprising a control terminal drive input line configured to simultaneously turn either the power switch or the auxiliary switch ON and the other of the power switch and the auxiliary switch OFF.

5. The switching cells of claim 1, further comprising:
at least one switching cell coupled in parallel with one of the switching cells of the series connection of switching cells.

6. The switching cells of claim 1, wherein at least one of the power switches comprises a wide band-gap semiconductor device.

7. The switching cells of claim 1, wherein an auxiliary switch of at least one of the switching cells is physically smaller than the power switch of another switching cell.

8. The switching cells of claim 1, wherein an auxiliary switch of at least one of the switching cells has lower power rating than the power switch of another switching cell.

9. The switching cells of claim 1, wherein at least one of the power switches comprises an IGBT, MOSFET, HEMT, BJT, JFET, GTO or GCT.

10. The switching cells of claim 1, wherein each of at least some of the switching cells comprises a vertical FET device or a lateral HEMT as the power switch.

11. The switching cells of claim 1, wherein at least one of the switching cells has a resistor in parallel with the cell inductor of respective switching cell.

12. The switching cells of claim 1, comprising:
a drive circuit for driving a control terminal of the power switch or a control terminal of the auxiliary switch of one of the switching cells, the drive circuit configured to draw power from the one of the switching cells.

13. A phase arm for the power converter, the phase arm comprising the plurality of switching cells of claim 1.

14. A power converter phase leg having arms coupled together to provide an output signal for driving the load, at least one of the arms according to claim 13.

15. The power converter for driving the load, the power converter comprising at least one power converter phase leg of claim 14, each of the phase legs having an output line for driving a phase input of a respective load, the power converter further comprising a link capacitor, the at least one power converter phase leg and the link capacitor being coupled between a first power rail and a second power rail.

16. The power converter according to claim 14, wherein the power converter is a multilevel converter.

17. A method of making the power converter, the method comprising the steps of:
obtaining a second power converter comprising a phase arm having at least one IGBT and replacing a phase arm with the phase arm according to claim 13, at least one of the switching cells of the phase arm according to claim 13 having wide band-gap semiconductor device as the power switch of the switching cell.

18. A method of making the power converter, the method comprising the steps of:
obtaining a second power converter comprising a phase arm having a turn-on snubber and a GTO module, and replacing the turn-on snubber and at least one GTO module with the phase arm according to claim 13.

19. A method of controlling a power converter to drive a load, the power converter having a phase leg coupled between two power rails and comprising two arms each having a switching cells and coupled at an output of the power converter, wherein each of the switching cells comprises:
a respective power switch for conducting a current for driving the load;
a respective series connection comprising an auxiliary switch and a cell capacitor coupled in series, the series connection coupled in parallel with the power switch;
a respective cell inductor coupled to a coupling of the power switch and the series connection; and
a commutation loop to conduct a commutation current arising from turn-off of the power switch, the loop comprising:
a first bypass circuit for blocking current flow in a first direction and coupled in parallel with the power switch to conduct a commutation current in a second direction, opposite to the first direction;
a second bypass circuit for blocking current flow in the second direction and coupled in parallel with the auxiliary switch to conduct a commutation current in the first direction; and
the cell capacitor,
the method comprising at least one step of:
switching a first number of switching cells of one of the arms ON and a second number of the switching cells of the other of the arms OFF to advance a voltage profile at the output of the converter and maintain a voltage across the phase leg, switching the first number of switching cells ON by turning the power switch of the switching cell ON and the auxiliary switch of the switching cell OFF, the first and second numbers being one or more.

20. The method of claim 19, wherein at least two of the switching cells of an arm of the two arms are coupled in parallel, the method comprising switching the switching cells coupled in parallel at different times.

21. The method of claim 19, wherein each of the arms comprises an array having a number (NS) of rows and a number (NP) of columns of the switching cells, wherein the numbers NS and NP are one or more,
each of the columns comprises a series connection of the switching cells coupled between a respective one of the power rails and the converter output, and
the method comprises less than or equal to NS×NP steps to generate the voltage profile.

22. The method of claim 19, wherein the voltage profile varies between a voltage of one of the power rails and a voltage of the other of the power rails.

23. The method of claim 19, further comprising the step of:
- determining a switching firing pattern of the switching cells according to a derivative (dv/dt) value of a voltage profile transition.

* * * * *